Jan. 2, 1934.　　　　S. G. SYLVAN　　　　1,941,450

AIR FILTER

Filed Feb. 21, 1931

INVENTOR.
Stig G:son Sylvan
BY Arthur J. Robert
ATTORNEY

Patented Jan. 2, 1934

1,941,450

UNITED STATES PATENT OFFICE 1,941,450

AIR FILTER

Stig G:son Sylvan, Louisville, Ky., assignor to American Air Filter Company, Inc., Louisville, Ky., a corporation of Delaware Application February 21, 1931
Serial No. 517,468

2 Claims. (Cl. 183—71)

This invention relates to air filtering or cleaning devices of the type utilizing as a filter medium a series of expanded metal sheets or other smooth surfaced sheet-like bodies having relatively large openings placed one after another so that they cooperate to define a complicated and uninterrupted maze or labyrinth of tortuous paths which serve to divide the air flow into a number of small streams and to subdivide, reunite and thereby deflect these small streams haphazardly thruout the filtering depth. The deflections to which the air is subjected cause the impurities to impinge upon the surfaces of the filtering medium which are usually coated with a viscous material so as to catch and securely hold the particles and thereby effectively separate them from the air.

The use of expanded metal as a filtering material is desirable because it can be obtained on the market as a standard product with openings of a size suitable for general air filtering purposes. It has the objection, however, along with other smooth surfaced filtering materials of failing to hold a substantial quantity of viscous liquid when wetted therewith. As a result the viscous coating remaining on the material may be entirely absorbed by comparatively small amount of dust, leaving the surface dry and consequently reducing its effectiveness and efficiency.

An object of the present invention is to overcome the objection noted without the necessity of specially treating the filtering material so as to enable it to hold a desired quantity of viscous liquid.

Another object is to provide in combination with a material such as expanded metal another readily available and easily applied type of filtering material which will operate to retain a comparatively large quantity of liquid both on itself and upon the expanded metal.

Another object is to provide a construction in which the possibility of blocking or clogging the air passages between adjacent filtering elements before the openings of the elements themselves are blocked or clogged is prevented.

Figure 1:
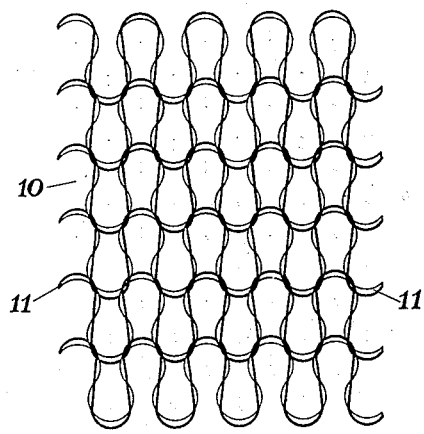
Figure 2:
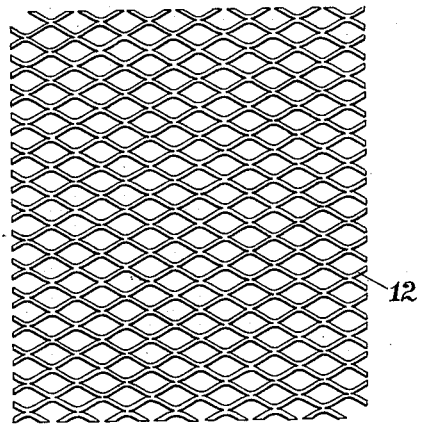
Figure 3:
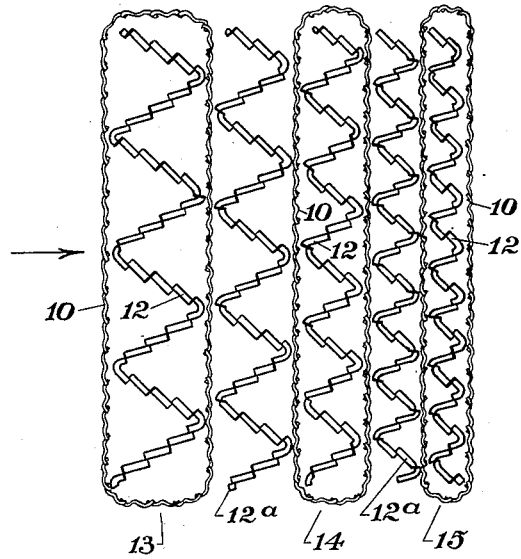

The invention is illustrated in the accompanying drawing wherein Figure 1 is a plan view of a metal fabric suitable for use in accordance with the invention;

Fig. 2 is a plan view of an expanded metal sheet suited for the purpose of the invention; and Fig. 3 is a filter arrangement by which the invention may be carried out.

Generally stated the invention consists in placing in contact with expanded metal or other smooth surfaced filtering material a device which affords a large number of liquid-holding reservoirs or points. The device utilized may be any coarsely interlaced, knitted or woven fabric composed of a suitable material such as cloth or metal. The copper mesh fabric shown in the Jordahl Patent No. 1,676,191, dated July 3rd, 1928, is particularly suitable. This fabric which is indicated generally in Figure 1 by the numeral 10 consists of flexible ribbon-like strands 11 of copper wire knitted into a sheet. The construction is such that each strand 11 extends across the sheet in one direction and in general parallel relation with the strands on either side. Each strand is formed with a continuous series of loops, the alternate loops of which are loosely inter-knitted with the similar loops of a strand on one side, the remaining alternate loops being inter-knitted with the similar loops of a strand on the other side. While the ribbon-like strands may be made very smooth, a sheet composed of such strands has an advantage over the usual smooth type of filtering material, such as expanded metal, in that it will securely retain a considerable quantity of viscous material, such as oil, because of the multitude of strand intersections. Each of these intersections has a comparatively large area of angularly extending interlocking surfaces which, by virtue of capillary attraction, firmly hold a substantial amount of oil. Naturally such a condition will occur with most any type of loosely woven or knitted fabric composed of metal, while the absorbent property of a fabric composed of cloth will serve the same end.

This fabric if held against a smooth surface filtering material, such as the expanded metal sheet 12 shown in Figure 2, will slowly supply liquid thru its contact points at a rate largely determined by the dryness of the expanded metal. The fabric may be held in contact with the expanded metal sheets in any desired way as by wrapping it around the sheets, this being the method employed in the arrangement shown in Figure 3.

The construction shown in Figure 3 consists of three separated elements, 13, 14 and 15, each of which consists of an expanded metal sheet 12 and copper mesh fabric 10, the fabric 10 being wrapped around the sheet 12. The sheets 12 may be flat but I prefer to corrugate them as shown in Figure 3 in order to provide space between successive dust-holding parts sufficient to prevent the clogging or blocking of the air passages between such parts before the openings in the parts themselves are blocked or clogged. Furthermore, in order to provide a progressive graduating effect thruout the depth of the filter I make the corrugation of the various sheets 12 progressively decrease in size so that the corrugations of the sheet in element 13 are larger than those of 14, while the corrugations of the sheet in 14 in turn are larger than the sheet used in element 15. The clogging tendency between successive elements is further decreased by separating the various elements by means of corrugated plates or sheets 12a, while the progressive graduating effect is further enhanced by making the plates 12a decrease progressively in size of corrugation. In fact it is preferred that the series of corrugated sheets provided by the combination of sheets 12 and 12a be such as to effect a progressive decrease in size of corrugation thruout the depth of the filter, but this however is not essential.

An advantage of this type of construction is that the fabric or wrapper 10 provides a large number of oil-holding reservoirs, some of which are in contact with the sheets 12 and 12a. By virtue of these contact points the fabric 10 will supply oil to the sheets 12 and 12a and thereby prevent them from drying rapidly thru a slight accumulation of dust. Furthermore the plates or sheets 12 provide a support for the fabric which is not in itself self-supporting in sheet form.

It should be understood that the arrangement shown in the drawing is exaggerated to bring out the invention more clearly and consequently make the filter appear of considerable depth. It is not necessary however that it be of any great depth. In fact I prefer the cell type of filter in which the depth is smaller than one or both of the face dimensions.

Having described my invention, I claim:

1. A filter medium for air filters having a series of filter elements separated from each other by an interposed series of open-mesh plates, each filter element consisting of an open-mesh plate and a flexible, coarsely-interlaced open-mesh fabric extending around and supported by said plate.

2. A filter medium for air filters having a series of filter elements separated from each other by an interposed series of corrugated open-mesh plates, each filter element consisting of a corrugated open-mesh plate and a flexible, coarsely-interlaced, open-mesh fabric extending around and supported by said plate, the corrugations of said plates progressively decreasing in the direction of air flow.

STIG G:SON SYLVAN.